(12) United States Patent
Ando

(10) Patent No.: US 7,711,925 B2
(45) Date of Patent: May 4, 2010

(54) INFORMATION-PROCESSING DEVICE WITH TRANSACTION PROCESSOR FOR EXECUTING SUBSET OF INSTRUCTION SET WHERE IF TRANSACTION PROCESSOR CANNOT EFFICIENTLY EXECUTE THE INSTRUCTION IT IS SENT TO GENERAL-PURPOSE PROCESSOR VIA INTERRUPT

(75) Inventor: Hisashige Ando, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1646 days.

(21) Appl. No.: 09/746,068

(22) Filed: Dec. 26, 2000

(65) Prior Publication Data
US 2001/0005880 A1 Jun. 28, 2001

(30) Foreign Application Priority Data
Dec. 27, 1999 (JP) .................................. 11-371617
Nov. 15, 2000 (JP) .............................. 2000-348475

(51) Int. Cl.
*G06F 9/54* (2006.01)
*G06F 15/163* (2006.01)
(52) U.S. Cl. .......................................... 712/34; 712/36
(58) Field of Classification Search .................... 712/31, 712/34, 35, 36
See application file for complete search history.

(56) References Cited

U.S. PATENT DOCUMENTS 3,631,405 A * 12/1971 Hoff et al. .................... 712/209
4,073,005 A * 2/1978 Parkin ......................... 718/104
4,395,758 A * 7/1983 Helenius et al. ................ 712/34
4,991,080 A * 2/1991 Emma et al. ................. 712/206
5,329,626 A * 7/1994 Klein et al. .................. 709/248
6,330,658 B1 * 12/2001 Evoy et al. ..................... 712/31

FOREIGN PATENT DOCUMENTS

JP 03-073008 11/1991
JP 05334265 A 12/1993

OTHER PUBLICATIONS

Computer Organization and Design—The Hardware/Software Interface, 2nd Edition, John L Hennessy and David A Patterson, Morgan Kaufmann Publishers, 1998; pp. 191, 712, 716.*
German Office Action mailed Feb. 23, 2007 in corresponding German patent application (5 pages) w/ Eng. Translation (4 pages).
Japanese Office Action mailed Jan. 23, 2007 and issued in corresponding Japanese Patent Application 2000-348475 (3 pages).
Japanese Office Action mailed Jan. 23, 2007 and issued in respect to Japanese Patent Application 2000-348475 cites JP03-73008.

* cited by examiner

*Primary Examiner*—Daniel Pan
(74) *Attorney, Agent, or Firm*—Staas & Halsey LLP

(57) ABSTRACT

An information-processing device that executes a specific process more frequently than other processes among a variety of processes is provided. The information-processing device includes a first processor capable of executing an instruction set corresponding to the variety of processes, and a second processor capable of executing a portion of or the entire instruction set, the second processor being capable of executing a part of the instruction set corresponding to the specific process more efficiently than the first processor, wherein the second processor executes the specific process whereas the first processor executes the other processes. Accordingly, the information-processing device can execute a variety of instructions efficiently.

16 Claims, 10 Drawing Sheets

INFORMATION-PROCESSING DEVICE WITH TRANSACTION PROCESSOR FOR EXECUTING SUBSET OF INSTRUCTION SET WHERE IF TRANSACTION PROCESSOR CANNOT EFFICIENTLY EXECUTE THE INSTRUCTION IT IS SENT TO GENERAL-PURPOSE PROCESSOR VIA INTERRUPT

BACKGROUND OF THE INVENTION

1. Field of the Invention

The present invention generally relates to an information-processing device, and more particularly relates to an information-processing device that executes both general-purpose processing and transaction processing of data.

2. Description of the Related Art

Current high-performance general-purpose processors are usually designed to rapidly execute instructions suitable for a wide variety of applications such as commercial applications, scientific applications and multimedia processing. For instance, a current high-performance general-purpose processor includes a floating-point unit so as to rapidly execute scientific applications that require execution of a large amount of floating-point arithmetic operations. In general, high-performance general-purpose processors are designed to execute a single program consisting of a series of instructions. In order to execute the series of instructions rapidly, each high-performance general-purpose processor includes a function to predict a branch outcome for executing a branch instruction before a branch direction is known, a reservation station for efficient out-of-order execution of instructions, and a reorder buffer for keeping track of results from the instructions executed out of order.

However, recently, a demand for computers has been increasing especially in areas of systems that execute transaction processing and web server processing. Operations executed in the transaction processing and the web server processing are mainly logical operations and integer operations so that a frequency of executing the floating-point arithmetic operations is low in the transaction processing and the web server processing. In addition, in the transaction processing and the web server processing, a performance to concurrently execute a large number of small-sized processes takes priority over a performance to execute a single large-sized program rapidly.

As described above, the current high-performance general-purpose processors are designed to achieve high performance over a wide computing area, and thus include a large amount of hardware inefficiently utilized for executing the transaction processing and the web server processing. Additionally, a large amount of hardware required for rapid execution of a single large-sized sequential program is overkill for concurrent execution of large quantities of simple processes as required in the transaction processing and the web server processing without carrying overhead hardware for functions rarely required. Therefore, there has been a demand for an information-processing device that can rapidly execute the transaction processing and the web server processing.

A description will now be given of a conventional high-performance general-purpose processor with reference to FIG. 1. A high-performance general-purpose processor 1 shown in FIG. 1 includes an instruction cache and instruction control unit 2, a branch-prediction unit 3, a program counter 4, a checkpoint unit 5, a fixed-point register file 6, a floating-point register file 7, a fixed-point reorder buffer 8, a floating-point reorder buffer 9, a fixed-point reservation station 10, a floating-point reservation station 11, a load/store reservation station 12, a fixed-point unit 13, a floating-point unit 14, a load/store unit 15 and a data cache 16.

The instruction cache and instruction control unit 2 stores instructions, as well as fetches and distributes instructions to be executed. Each unit in the high-performance general-purpose processor 1 is controlled by a result of decoding fetched instructions. The branch-prediction unit 3 detects a conditional branch instruction from decoded instructions, and predicts a direction of each branch before a branching condition is known. The program counter 4 points to an address of an instruction being executed in order. The checkpoint unit 5 stores a processor status including register values and the like when a branch instruction is executed based on a branch prediction. If the branch prediction has been proved wrong, the high-performance general-purpose processor 1 can recover the processor status including the register values before branching by reading information stored in the checkpoint unit 5, thereby recovering from a branch prediction error.

The fixed-point register file 6 stores operands for fixed-point operations, and supplies the operands necessary to execute the operation to the fixed-point reservation station 10. Additionally, the fixed-point register file 6 stores operands for load/store instructions, and supplies the operands necessary to execute the instruction to the load/store reservation station 12. The fixed-point reorder buffer 8 stores results of calculations executed by the fixed-point unit 13 and results of load instructions executed by the load/store unit 15. Additionally, the fixed-point reorder buffer 8 has capability of rectifying an order of generated results as if they were generated in order, and supplies correct operands to corresponding reservation stations.

The floating-point register file 7 stores operands for floating-point operations, and supplies the operands necessary to execute the operation to the floating-point reservation station 11. Additionally, the floating-point register file 7 stores operands for load/store instructions, and supplies the operands necessary to execute the instruction to the load/store reservation station 12. The floating-point reorder buffer 9 stores results of calculations executed by the floating-point unit 14 and results of a load instruction executed by the load/store unit 15. Additionally, the floating-point reorder buffer 9 has capability of rectifying an order of generated results as if they were generated in order, and supplies correct operands to corresponding reservation stations.

The fixed-point reservation station 10 stores fixed-point instructions used for executing fixed-point operations. The fixed-point reservation station 10 waits for operands necessary to execute fixed-point instructions to be supplied from the fixed-point register file 6, from the fixed-point reorder buffer 8, or directly from the fixed-point unit 13 or the load/store unit 15. The fixed-point instructions stored in the fixed-point reservation station 10 become executable after receiving all the operands necessary to execute the instructions. In such a case, the fixed-point reservation station 10 selects executable instructions, and supplies the executable instructions to the fixed-point unit 13. The maximum number of fixed-point instructions the fixed-point reservation station 10 can supply simultaneously to the fixed-point unit 13 is equal to the number of fixed-point operation modules provided in the fixed-point unit 13. It should be noted that the fixed-point unit 13 includes a plurality of the fixed-point operation modules, each fixed-point operation module executing the instructions supplied from the fixed-point reservation station 10.

The floating-point reservation station 11 stores floating-point instructions used for executing floating-point operations. The floating-point reservation station 11 waits for operands necessary to execute floating-point instructions to be supplied from the floating-point register file 7, from the floating-point reorder buffer 9, or directly from the floating-point unit 14 or the load/store unit 15. The floating-point instructions stored in the floating-point reservation station 11 become executable after receiving all the operands necessary to execute the instructions. In such case, the floating-point reservation station 11 selects executable instructions, and supplies the executable instructions to the floating-point unit 14. The maximum number of floating-point instructions the floating-point reservation station 11 can supply simultaneously to the floating-point unit 14 is equal to the number of floating-point operation modules provided in the floating-point unit 14. It should be noted that the floating-point unit 14 includes a plurality of the floating-point operation modules, each floating-point operation module executing the instructions supplied from the floating-point reservation station 11.

The load/store reservation station 12 stores load/store instructions. The load/store reservation station 12 waits for operands necessary to execute load/store instructions to be supplied from the fixed-point register file 6, the floating-point register file 7, the fixed-point reorder buffer 8, or the floating-point reorder buffer 9. The load/store instructions become executable after receiving all the operands necessary to execute the instructions. In such case, the load/store reservation station 12 selects executable instructions, and supplies the executable instructions to the load/store unit 15. The maximum number of load/store instructions the load/store reservation station 12 can supply to the load/store unit 15 is equal to the number of load/store operation modules provided in the load/store unit 15. It should be noted that the load/store unit 15 includes a plurality of the load/store operation modules, each load/store operation module executing the instructions supplied from the load/store reservation station 12.

The fixed-point unit 13 executes the fixed-point instructions supplied from the fixed-point reservation station 10, and sends results of executed fixed-point operations to the fixed-point reorder buffer 8, the fixed-point reservation station 10 and the load/store reservation station 12. Similarly, the floating-point unit 14 executes the floating-point instructions supplied from the floating-point reservation station 11, and sends results of executed floating-point operations to the floating-point reorder buffer 9, the floating-point reservation station 11 and the load/store reservation station 12. Additionally, the load/store unit 15 executes the load/store instructions supplied from the load/store reservation station 12, and sends results of executed load/store operations to the fixed-point reorder buffer 8 and the fixed-point reservation station 10, or to the floating-point reorder buffer 9 and the floating-point reservation station 11. The load/store unit 15 writes data in the data cache 16 when executing a storing instruction. The load/store unit 15 reads data from the data cache 16 when executing a load instruction.

The high-performance general-purpose processor 1 can execute both fixed-point arithmetic/logical operations and floating-point arithmetic operations by including the fixed-point unit 13 and the floating-point unit 14. Additionally, the high-performance general-purpose processor 1 includes the branch-prediction unit 3, the fixed-point reorder buffer 8, the floating-point reorder buffer 9, the fixed-point reservation station 10, the floating-point reservation station 11 and the load/store reservation station 12 so that the high-performance general-purpose processor 1 can predict a branch direction for executing a branch instruction before a branch direction is known, and can produce results as if instructions are executed in order when real execution takes advantage of out-of-order execution.

As described above, the high-performance general-purpose processor 1 is designed to rapidly execute various instructions over the wide computing area, and to execute sequential programs rapidly by using branch prediction and out-of-order execution. The high-performance general-purpose processor 1 also has multiple operation modules in the fixed-point unit 13, in the floating-point unit 14, and in the load/store unit 15. With those operation modules, the high-performance general-purpose processor 1 can execute six to eight instructions simultaneously.

FIG. 2 is a block diagram showing a multi-thread transaction processing system. A multi-thread transaction processing system 17 using a multi-thread method includes transaction processors 18-1 through 18-n, a memory 19, an input/output interface 20 and a system bus 21.

Each of the transaction processors 18-1 through 18-n includes a plurality of program counters for multi-thread processing, thereby executing transaction processes efficiently. The memory 19 is connected through the system bus 21 to the transaction processors 18-1 through 18-n, and is universally used among the transaction processors 18-1 through 18-n. The input/output interface 20 provides an interface connecting the system bus 21 and peripheral devices located outside the multi-thread transaction processing system 17.

FIG. 3 is a block diagram showing a transaction processor. The transaction processor 18-1 shown in FIG. 3 includes an instruction cache and instruction control unit 22, program counters 23, register files 24, a fixed-point unit 25, a load/store unit 26 and a data cache 27. It should be noted that the instruction cache and instruction control unit 22, the program counters 23, the register files 24, the fixed-point unit 25, the load/store unit 26 and the data cache 27 correspond respectively to the instruction cache and instruction control unit 2, the program counter 4, the fixed-point register file 6, the fixed-point unit 13, the load/store unit 15 and the data cache 16 shown in FIG. 1. In addition, each of the transaction processors 18-1 through 18-n has a structure shown in FIG. 3. In this embodiment, a floating-point unit is not implemented since cost of hardware is too high compared to performance gain in transaction processing, which does not require floating-point calculations often. Furthermore, the transaction processors 18-1 through 18-n are designed mainly to simultaneously execute a large number of programs, for instance, the number of processors multiplied by the number of program counters in each processor, rather than to execute a single program rapidly, and thus do not include functions to predict branch directions, reorder buffers and reservation stations. Instead, each of the transaction processors 18-1 through 18-n includes a plurality of program counters 23 and the register files 24 for multi-threading. Taking ATM transaction processing as an example, A single process using a single program counter in a transaction processor can handle a withdrawal for a user A, at the same time, a withdrawal for a user B by using another program counter. Consequently, each of the transaction processors 18-1 through 18-n can execute a plurality of ATM transaction processes simultaneously.

Recently, processor speed has been increasing substantially, whereas memory speed has not increased as the processor speed. Such a condition makes a long memory access time and a resulting processor stall major performance impediments. In a case that a waiting period to access a memory happens to the transaction processor 18-1 while executing a series of instructions for a first process, the transaction processor 18-1 can execute another series of instructions for a second process by using another program counter shown in FIG. 3, thereby improving overall efficiency of utilizing hardware resources. As described above, the transaction processor 18-1 shown in FIG. 3 can execute transaction processes efficiently.

The multi-thread transaction processing system 17 shown in FIG. 2 can execute a large number of processes simultaneously, and can execute transaction processes efficiently by including the transaction processors 18-1 through 18-n. In addition, a size of each transaction processor shown in FIG. 3 is smaller than the high-performance general-purpose processor so that multiple transaction processors can be fabricated on a single chip.

The high-performance general-purpose processor 1 shown in FIG. 1 includes many functions that are not cost-effective to execute simple transaction processes and web server processes as the high-performance general-purpose processor 1 is designed to execute a wide variety of applications efficiently. Additionally, the high-performance general-purpose processor 1 is less efficient for execution of large quantities of simple processes necessary in the transaction processes and the web server processes, since the high-performance general-purpose processor 1 is designed to execute a single program at a time. Even if an attempt to provide a plurality of high-performance general-purpose processors 1 in a system is made, the number of concurrently executed processes is less since the number of the high-performance general-purpose processors 1 that can be fabricated on a single chip is less because of its large circuit size.

On the other hand, in a case that a system includes only the multi-thread transaction processing system 17 shown in FIG. 2, the system can improve efficiency to execute transaction processes and/or web server processes, but cannot rapidly execute complicated processes such as a scientific arithmetic operation that needs floating-point arithmetic operations or a large process blocking execution of other small processes. Further, the system including only the multi-thread transaction processing system 17 does not have various functions to execute a single program rapidly. Accordingly, in a case that the system is asked to execute a single large-sized process or a complicated process, efficiency to execute such a process by the system decreases remarkably.

SUMMARY OF THE INVENTION

Accordingly, it is a general object of the present invention to provide an information-processing device capable of processing a variety of instructions efficiently. A more specific object of the present invention is to provide an information-processing device including processors, wherein the processors divide execution of instructions among them, thereby efficiently executing the instructions.

The above-described object of the present invention is achieved by an information-processing device that executes a specific process more frequently than other processes among a variety of processes, the information-processing device including a first processor capable of executing an instruction set corresponding to the variety of processes, and a second processor capable of executing a portion of or the entire instruction set, the second processor being capable of executing a part of the instruction set corresponding to the specific process more efficiently than the first processor, wherein the second processor executes the specific process whereas the first processor executes the other processes.

Accordingly, the information-processing device can execute a variety of instructions efficiently.

Other objects, features and advantages of the present invention will become more apparent from the following detailed description when read in conjunction with the accompanying drawings.

DESCRIPTION OF THE PREFERRED EMBODIMENTS

A description will now be given of preferred embodiments of the present invention, with reference to the accompanying drawings.

Figure 4:
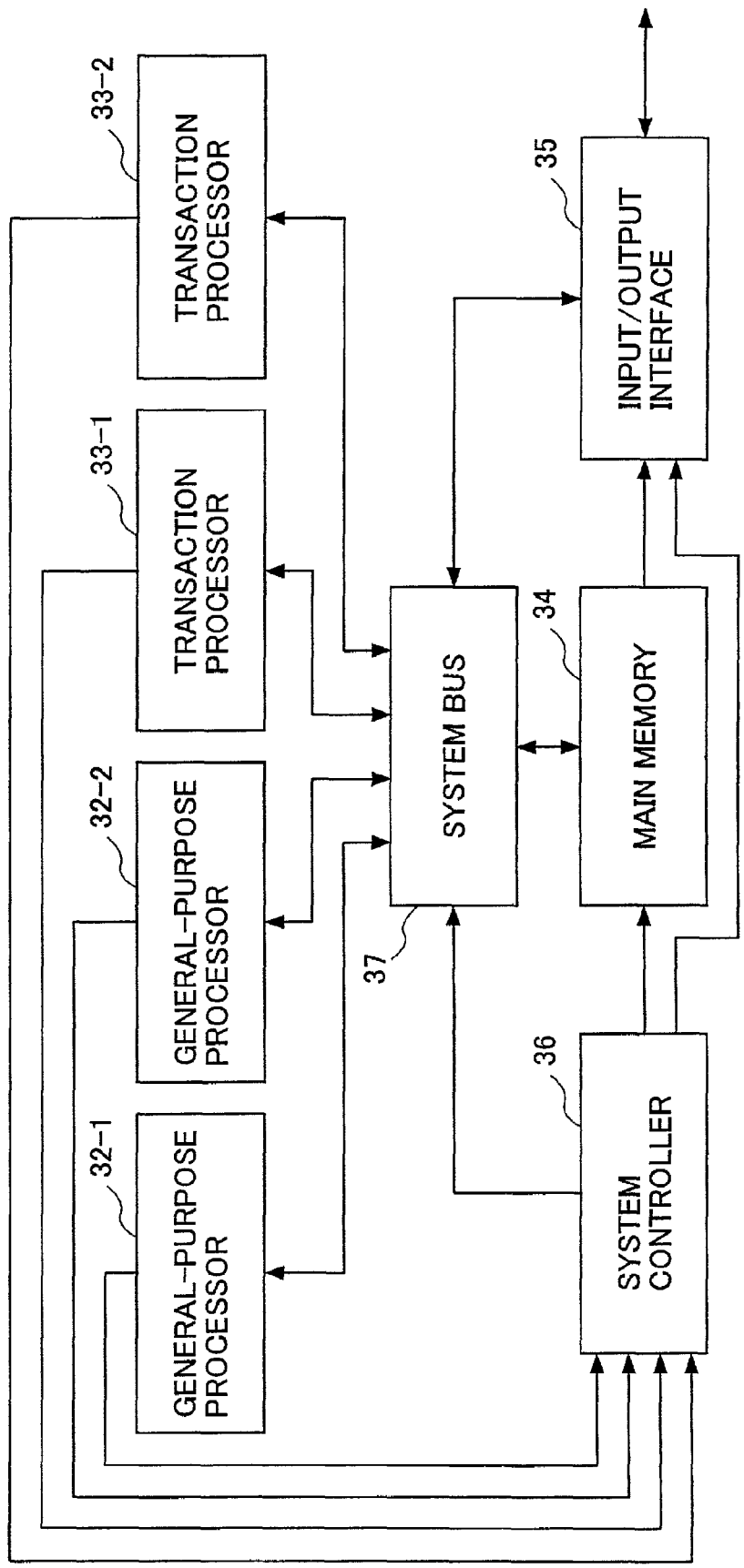
FIG. 4 is a system diagram showing an embodiment of the present invention.

FIG. 4 is a system diagram showing an embodiment of the present invention. An information-processing device 31 according to the embodiment includes general-purpose processors 32-1 and 32-2, transaction processors 33-1 and 33-2, a main memory 34, an input/output interface 35, a system controller 36 and a system bus 37.

Figure 1:
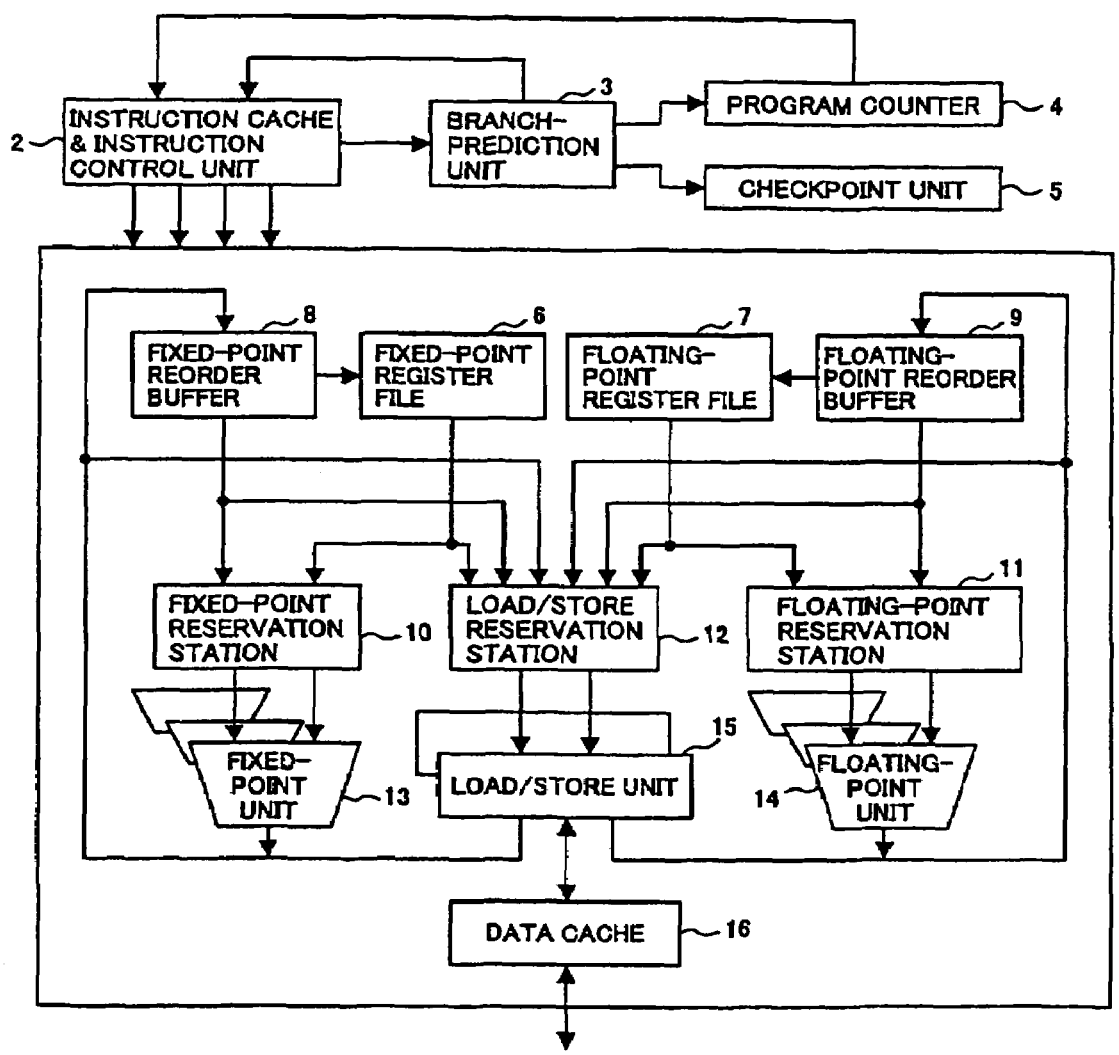
FIG. 1 is a block diagram showing a high-performance general-purpose processor.
Figure 2:
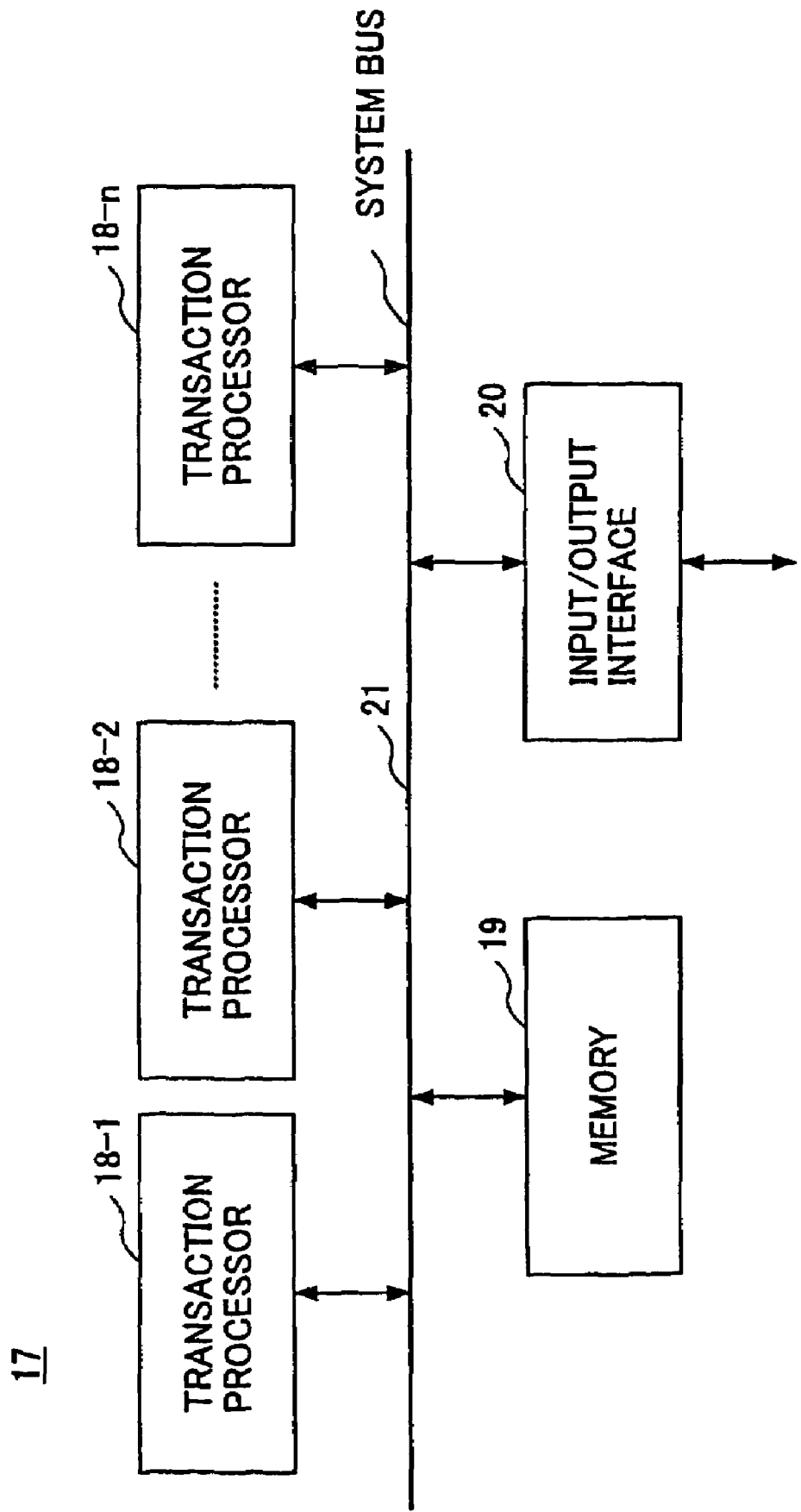
FIG. 2 is a block diagram showing a multi-thread transaction processing system.

Each of the general-purpose processors 32-1 and 32-2 are processors similar to the high-performance general-purpose processor 1 shown in FIG. 1. In other words, each of the general-purpose processors 32-1 and 32-2 can execute all types of processes rapidly. As each of the general-purpose processors 32-1 and 32-2 can predict a branch direction for executing a branch instruction before a branch direction is known, can execute instructions out of order. It should be noted that the number of the general-purpose processors 32-1 and 32-2 included in the information-processing device 31 is not limited to two. Thus, any number of the general-purpose processors can be included in the information-processing device 31 depending on a percentage of load that the other type of a processor cannot handle efficiently.

The transaction processors 33-1 and 33-2 can execute a large number of processes simultaneously. However, a speed of executing each process is slower than that of the general-purpose processors 32-1 and 32-2. Additionally, the transaction processors 33-1 and 33-2 may lack capability of executing certain instructions that are not important for transaction processing. Besides, each of the transaction processors 33-1 and 33-2 is designed to be a multi-thread system and/or a system including multiple processors, and thus can execute transaction processes efficiently. It should be noted that the number of the transaction processors 33-1 and 33-2 included in the information-processing device 31 is not limited to two. The information-processing device 31 may include any number of the transaction processors as the ratio of the load require.

The main memory 34 includes a RAM (Random Access Memory), and stores data therein. Additionally, the main memory 34 is connected through the system bus 37 to the general-purpose processors 32-1 and 32-2, and the transaction processors 33-1 and 33-2. Accordingly, the data stored in the main memory 34 is shared among the processors 32-1, 32-2, 33-1 and 33-2.

The input/output interface 35 provides an interface connecting the system bus 37 and peripheral devices located outside the information-processing device 31. The system controller 36 controls the system bus 37, the main memory 34 and the input/output interface 35 according to a request to access the main memory 34 or the input/output interface 35 through the system bus 37 from the general-purpose processors 32-1 and 32-2, and the transaction processors 33-1 and 33-2.

Figure 5:
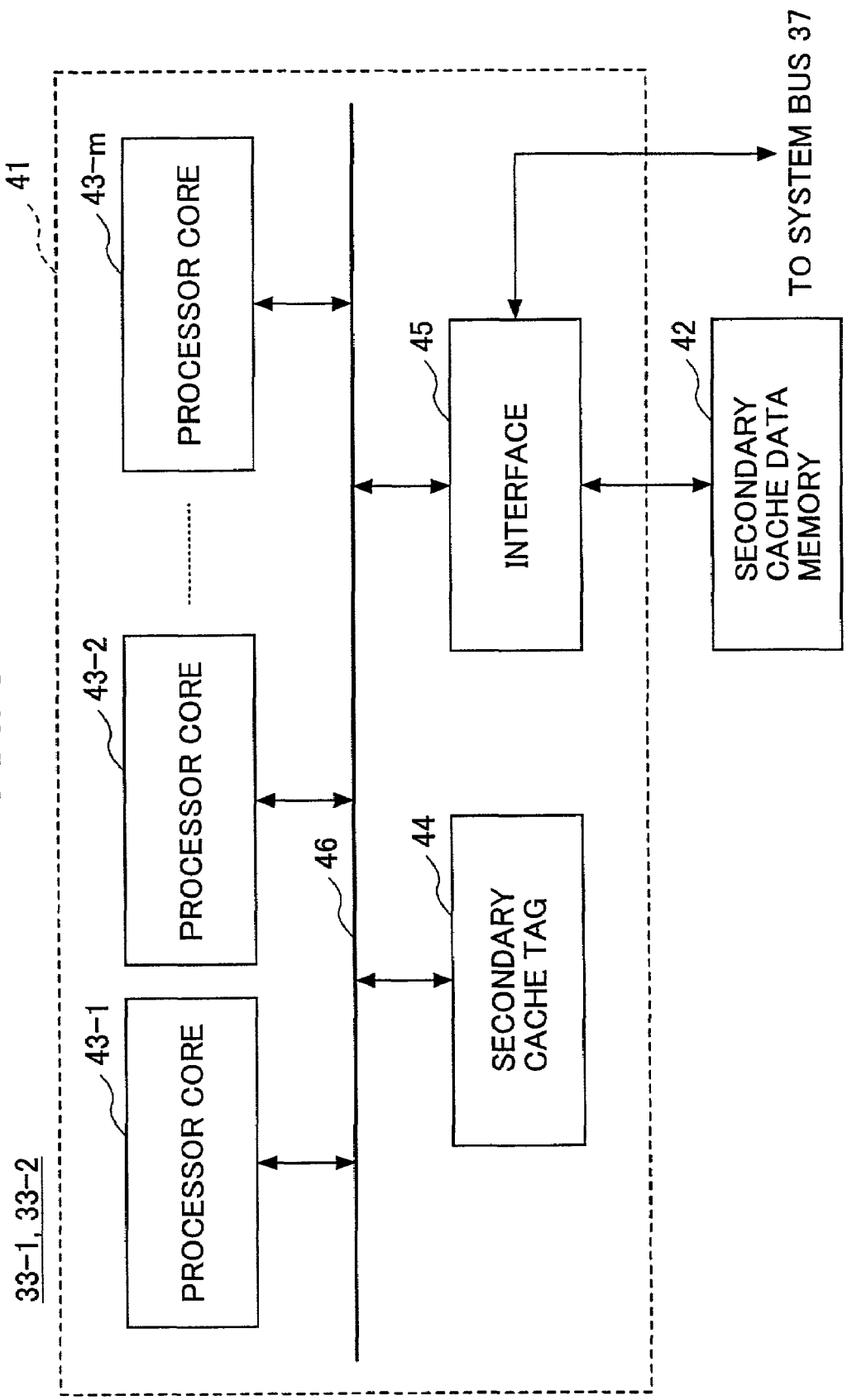
FIG. 5 is a block diagram showing a transaction processor in the embodiment of the present invention.

FIG. 5 is a block diagram showing a structure of the transaction processor 33-1. The transaction processor 33-1 shown in FIG. 5 includes a transaction-processing unit 41 and a secondary cache data memory 42. The transaction-processing unit 41 is fabricated on a single semiconductor chip whereto the secondary cache data memory 42 in this embodiment is provided outside the semiconductor chip. The secondary cache data memory 42 may be a RAM, and temporarily stores data and instructions therein.

The transaction-processing unit 41 includes processor cores 43-1 through 43-m, a secondary cache tag 44, an interface 45 and an internal bus 46. The processor cores 43-1 through 43-m are connected through the internal bus 46 to the secondary cache tag 44 and the interface 45. The secondary cache tag 44 manages usage of the secondary cache data memory 42. The interface 45 provides an interface connecting the secondary cache data memory 42 and the internal bus 46.

Figure 3:
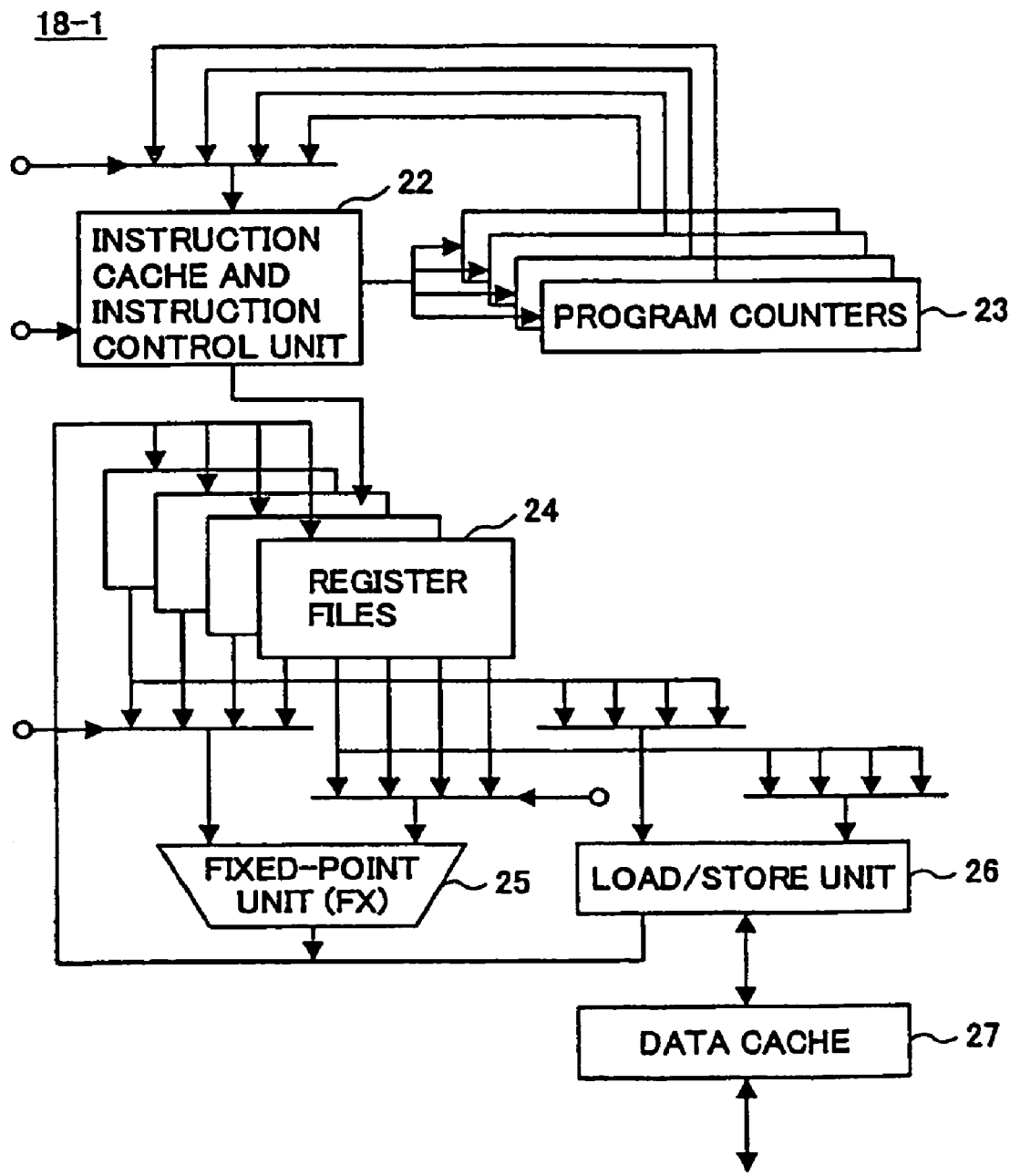
FIG. 3 is a block diagram showing a transaction processor.

The processor cores 43-1 through 43-m may have the same structure as the transaction processor 18-1 shown in FIG. 3. In other words, each of the processor cores 43-1 through 43-m is multi-threaded so as to efficiently execute transaction processes. Additionally, each of the processor cores 43-1 through 43-m does not necessarily need to include functions to execute complicated arithmetic operations such as floating-point arithmetic operations. Furthermore, each of the processor cores also does not necessarily need to include functions to predict branch directions for executing a branch instruction before the branch direction is known, or functions to execute instructions out of order. However, each of the processor cores 43-1 through 43-m is not necessarily multi-threaded since the transaction processors 33-1 and 33-2 can execute concurrent transaction processes by including a plurality of the processor cores 43-1 through 43-m. Even in an extreme case that each of the transaction processors 33-1 and 33-2 includes only the processor core 43-1, each of the transaction processors 33-1 and 33-2 can execute the concurrent transaction processes if the processor core 43-1 is specialized in transaction processing with multithreading as described with reference to FIG. 3.

Figure 6:
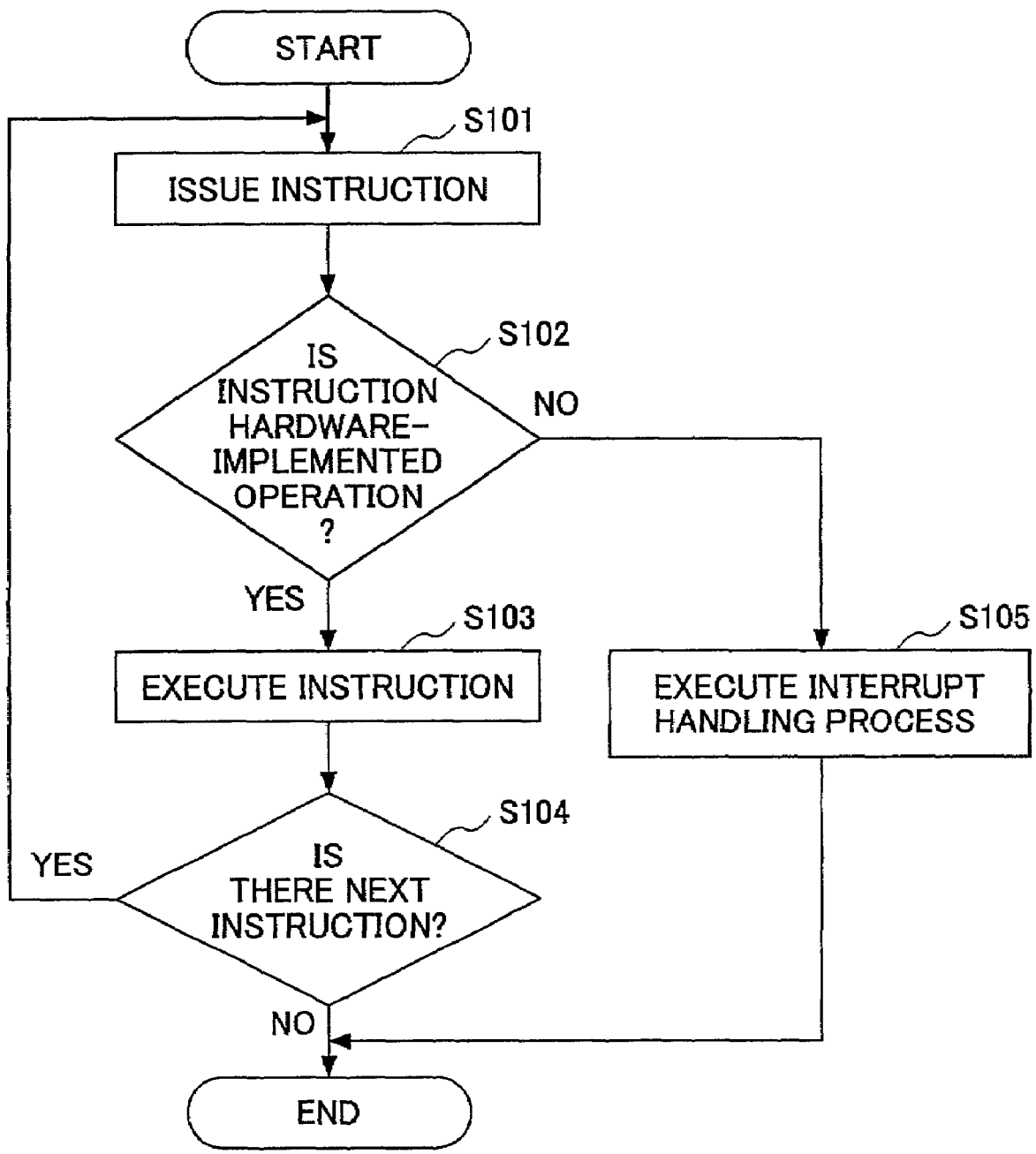
FIG. 6 is a flowchart showing processes to detect instructions lacking capabilities in the transaction processor in the embodiment of the present invention.

A description will now be given of processes performed by the transaction processors 33-1 and 33-2. FIG. 6 is a flowchart showing processes performed by the transaction processor according to the embodiment of the present invention. The transaction processor 33-1 executes steps S101 through S105.

At the step S101, the transaction processor 33-1 initially issues an instruction. Subsequently, at the step S102, the transaction processor 33-1 decides whether the instruction is directing execution of a hardware-implemented operation, for example, a fixed-point arithmetic operation. If it is ascertained at the step S102 that the instruction is directing execution of the hardware-implemented operation, the transaction processor 33-1 proceeds to the step S103, and executes the instruction. Subsequently, at the step S104, the transaction processor 33-1 decides whether there is a next instruction to be executed. If it is ascertained at the step S104 that there is the next instruction to be executed, the transaction processor 33-1 proceeds to the step S101, and issues the next instruction. If it is ascertained at the step S104 that the next instruction does not exist, the transaction processor 33-1 terminates the above-described processes.

If it is ascertained at the step S102 that the instruction is directing execution of an operation not implemented in hardware, the transaction processor 33-1 proceeds to the step S105, and generates an interrupt. After generating the interrupt, the transaction processor 33-1 terminates the above-described processes.

Figure 7:
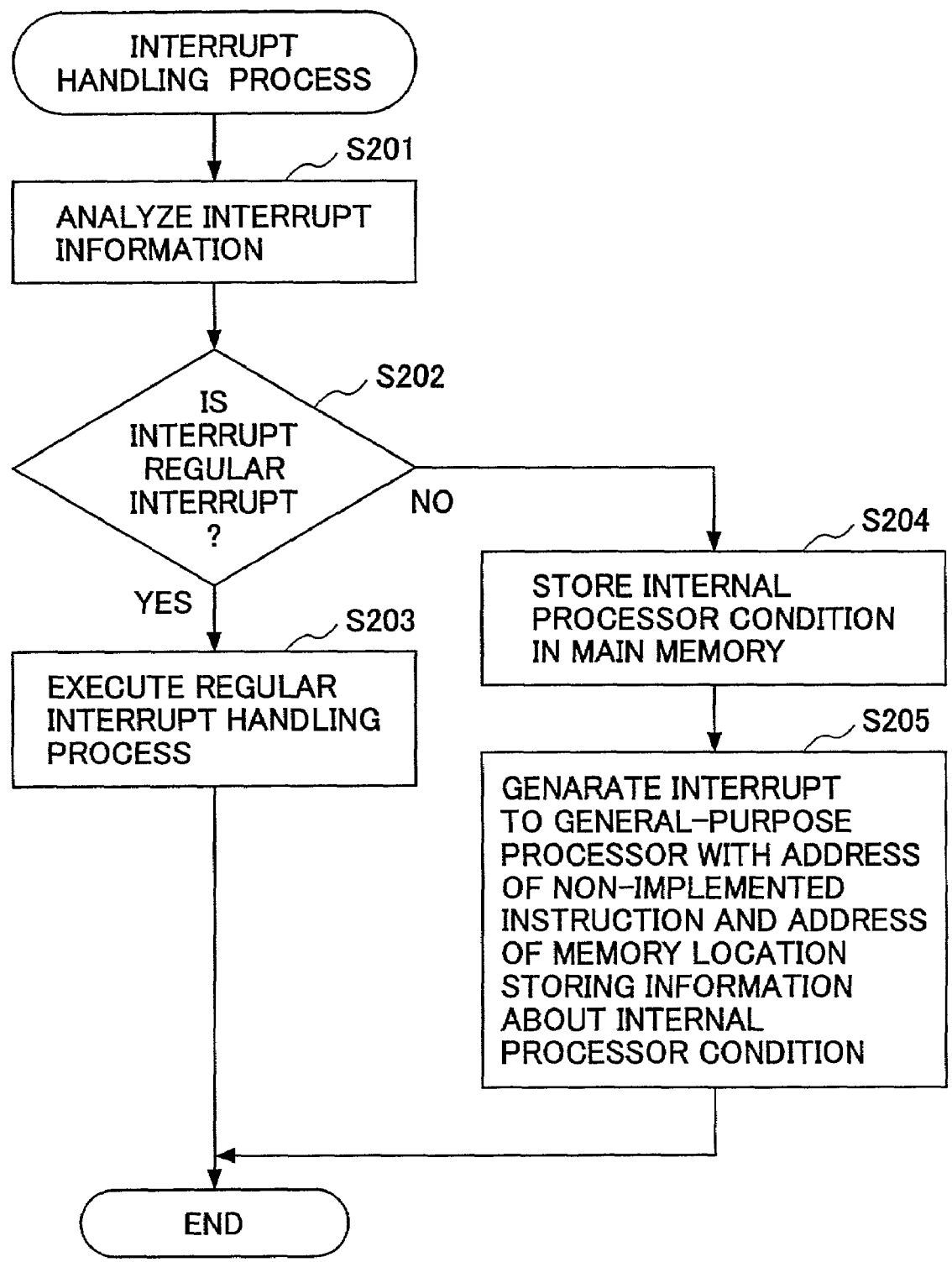
FIG. 7 is a flowchart showing an interrupting process in preparation to transfer execution of a process to the other type of a processor performed by the transaction processor in the embodiment of the present invention.

A description will now be given of an interrupt handling process executed by the transaction processor 33-1. FIG. 7 is a flowchart showing the interrupt handling process executed by the transaction processor according to the embodiment of the present invention. The transaction processor 33-1 executes steps S201 through S206 as the interrupt handling process.

At the step S201, the transaction processor 33-1 initially analyzes interrupt information that has been generated at the step S105. Subsequently, at the step S202, the transaction processor 33-1 decides whether an incoming interrupt is a regular interrupt or not. If it is ascertained at the step S202 that the incoming interrupt is the regular interrupt, the transaction processor 33-1 proceeds to the step S203, and executes the regular interrupt handling process. If it is ascertained at the step S202 that the interrupt is for executing a non hardware-implemented operation, for example, a floating-point arithmetic operation, the transaction processor 33-1 proceeds to the step S204. At the step S204, the transaction processor 33-1 stores an internal condition of the transaction processor 33-1 necessary for transferring execution of the non hardware-implemented operation, in a main memory. After storing the internal condition, the transaction processor 33-1 proceeds to the step S205, then stores an instruction address of the instruction that has been issued at the step S101 and a memory address of the internal condition stored in the memory, in internal registers of the transaction processor 33-1, and interrupts the general-purpose processor 32-1 or 32-2. To be concrete, the transaction processor 33-1 interrupts one of the general-purpose processors 32-1 and 32-2 by supplying an interrupt vector including contents of the above-described internal registers to one of the general-purpose processors 32-1 and 32-2. As described above, in a case that the transaction processor 33-1 or 33-2 detects an instruction to execute a non hardware-implemented operation, for example, a floating-point arithmetic operation, the transaction processor 33-1 or 33-2 interrupts one of the general-purpose processors 32-1 and 32-2.

Figure 8:
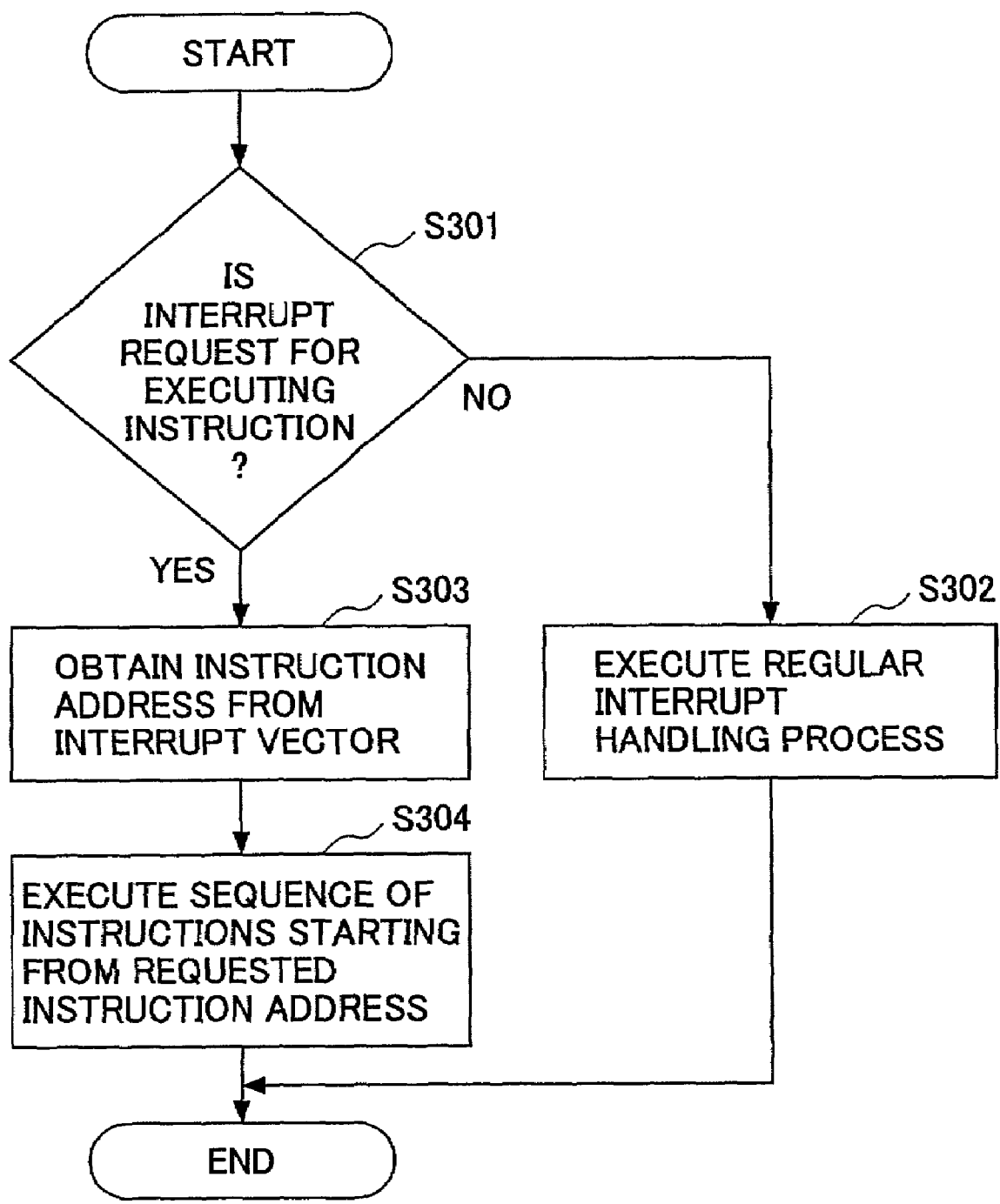
FIG. 8 is a flowchart showing processes performed by a general-purpose processor to accept transferred execution of the process in the embodiment of the present invention.

A description will now be given of processes performed by the general-purpose processor 32-1. FIG. 8 is a flowchart showing processes executed by the general-purpose processor according to the embodiment of the present invention. The general-purpose processor 32-1 executes steps S301 through S304.

Upon receiving an interrupt request from other processors such as the transaction processors 33-1, 33-2, the input/output interface 35 or internal units of the general-purpose processor 32-1, the general-purpose processor 32-1 starts executing processes transferred from the other type of a processor, at the step S301.

At the step S301, the general-purpose processor 32-1 decides whether the interrupt request is a request to the general-purpose processor 32-1 for executing a non hardware-implemented instruction transferred from one of the transaction processors 33-1 and 33-2. If it is ascertained at the step S301 that the interrupt request is not the request to the general-purpose processor 32-1 for executing an instruction transferred from one of the transaction processors 33-1 and 33-2, the general-purpose processor 32-1 executes a regular interrupt handling process at the step S302, and then terminates the above-described processes.

If it is ascertained at the step S301 that the interrupt request is the request to the general-purpose processor 32-1 for executing an instruction transferred from one of the transaction processors 33-1 and 33-2, the general-purpose processor 32-1 proceeds to the step S303, and obtains the interrupt vector supplied with the interrupt request, for instance, from the transaction processor 33-1. Additionally, the general-purpose processor 32-1 obtains the instruction address and a memory address from the interrupt vector. The general-purpose processor 32-1 copies the internal condition of the transaction processor 33-1 therein by using the memory address where the transaction processor 33-1 has stored the internal condition. Subsequently, at the step S304, the general-purpose processor 32-1 executes the instruction located at the above instruction address. In other words, the general-purpose processor 32-1 executes instructions starting from the instruction requested by the transaction processor 33-1. As described above, each of the general-purpose processors 32-1 and 32-2 executes a non hardware-implemented operation, for example, a floating-point arithmetic operation, and instructions following the instruction that could not be executed by the transaction processor 33-1 or 33-2.

According to the embodiment of the present invention as described above, in a case that an instruction to execute a non hardware-implemented operation such as a floating-point arithmetic operation is detected in the transaction processor 33-1 or 33-2, the transaction processor 33-1 or 33-2 in which the non hardware-implemented operation is detected interrupts the general-purpose processors 32-1 or 32-2 to let the general-purpose processors 32-1 or 32-2 execute the non hardware-implemented operation. In the embodiment, execution of the non hardware-implemented operation is transferred from the transaction processor 33-1 to the general-purpose processor 32-1. However, any instructions executed inefficiently by the transaction processor but efficiently by the general-purpose processor can be transferred from the transaction processor to the general-purpose processor in addition to non hardware-implemented operations. The present invention includes such embodiments.

In the present invention, a transaction process can be executed efficiently by transaction processors. However, an OS (Operating System) may be executed more efficiently by one of the general-purpose processors 32-1 and 32-2 since general-purpose processors can execute a single instruction stream faster than the transaction processors. However, selection of a processor executing the OS depends on efficiency of executing the OS, and thus the OS is not necessarily executed by one of the general-purpose processors 32-1 and 32-2. In other words, the OS may be executed by one of the transaction processors 33-1 and 33-2. Additionally, by sharing the main memory 34 among the general-purpose processors 32-1 and 32-2, and the transaction processors 33-1 and 33-2, the information-processing device 31 can pass a process efficiently between the processors.

Figure 9:
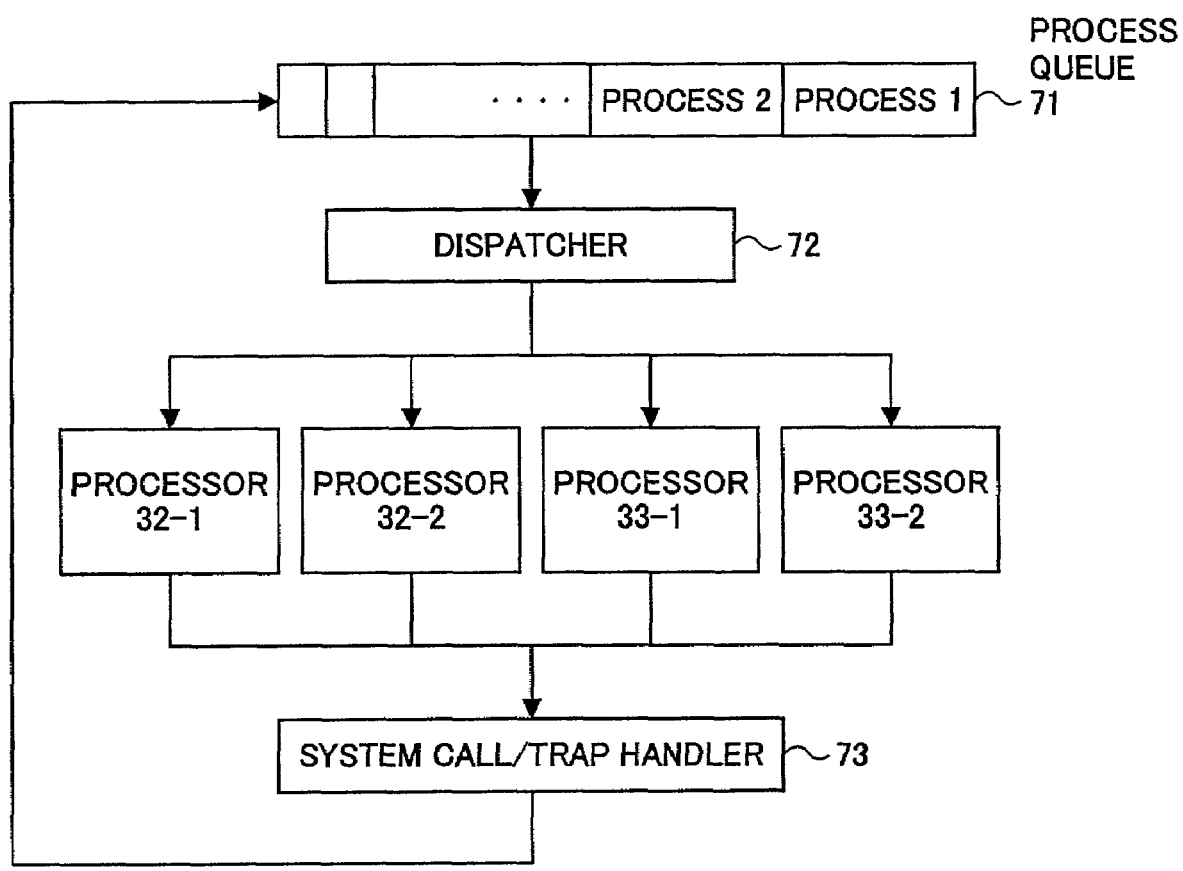
FIG. 9 is a block diagram showing an instruction-allocating process in the embodiment of the present invention.

A description will now be given of a process-allocating method for allocating processes to processors. FIG. 9 is a diagram showing a process-allocating function according to the embodiment of the present invention. The OS manages allocation of processes or threads stored in a process queue 71. This process-allocating function of the OS is achieved by a dispatcher 72. The process queue 71 stores processes to be executed by processors. The dispatcher 72 monitors a process indicated by the process queue 71 as well as monitors the general-purpose processors 32-1 and 32-2, and the transaction processors 33-1 and 33-2. The dispatcher 72 then allocates the process indicated by the process queue 71 to one of the processors. Since the system according to the present invention mainly executes transaction processes, all the processes are preferably allocated initially to the transaction processors 33-1 and 33-2 instead of the general-purpose processors 32-1 and 32-2. Alternatively, transaction processes may be allocated to the transaction processors 33-1 and 33-2, whereas processes initially not proved to be the transaction processes may initially be allocated to the general-purpose processors 32-1 and 32-2. Execution of allocated processes will be suspended by a system call (an interrupt by the OS) requesting input/output operations or requesting some system resources that are occupied by some other process. A system call/trap handler 73 suspends execution of processes according to contents of an interrupt when having received the system call from the process being executed or one of the general-purpose processors 32-1 and 32-2, and the transaction processors 33-1 and 33-2. Interrupt requesting not implemented in hardware described in FIG. 7 is one of the cause of process suspension, and enters into system call/trap handling. In addition, if execution of a certain process on one of the transaction processors 33-1 and 33-2 is determined inefficient such by a performance monitor, the process may issue a system call asking the execution be transferred to one of the general purpose processors 32-1 and 32-2.

Figure 10:
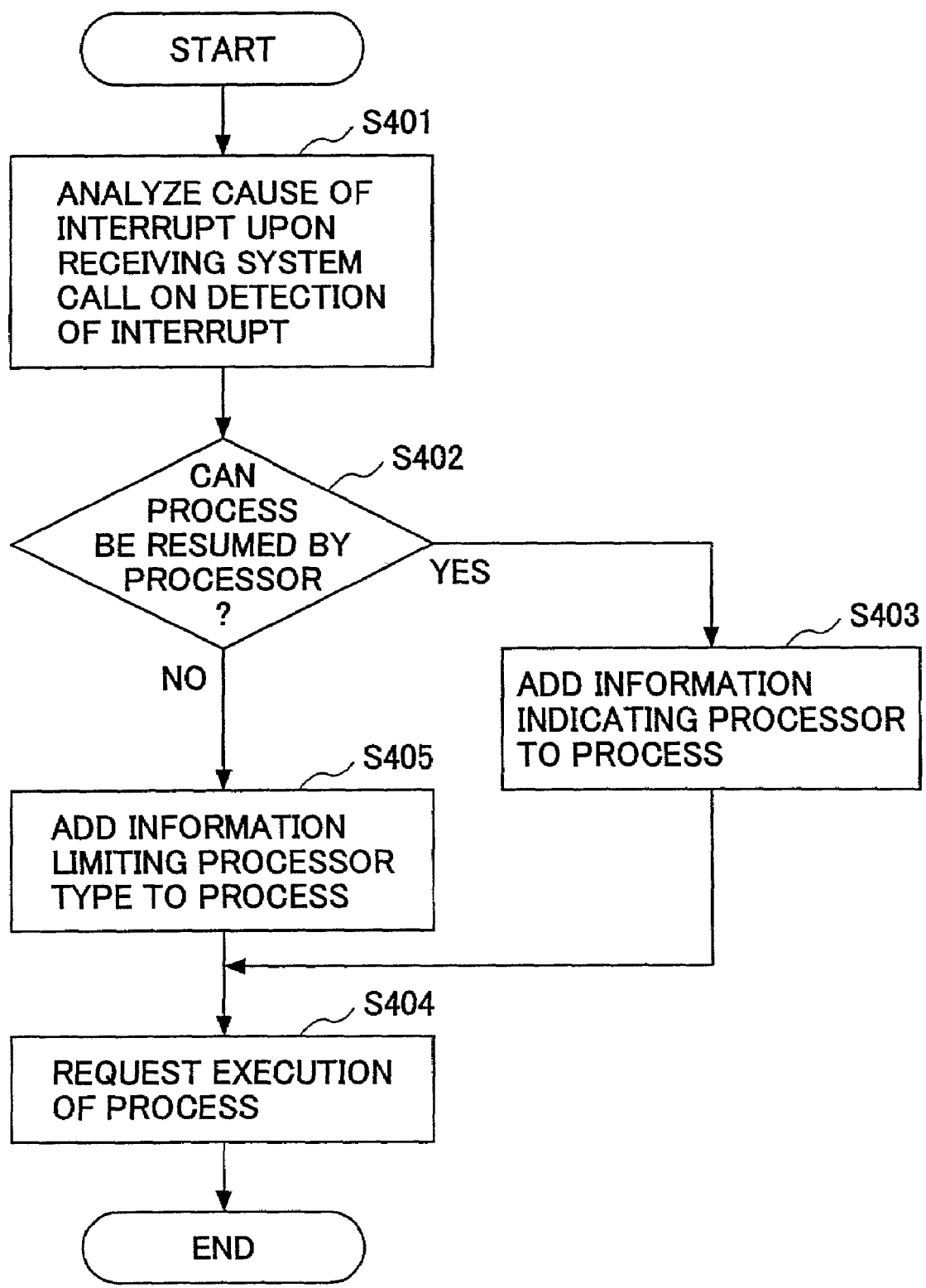
FIG. 10 is a flowchart showing processes performed by a processor-allocation control.

FIG. 10 is a flowchart showing the process-allocating function according to the embodiment. The system call/trap handler 73 executes steps S401 through S405 shown in FIG. 10. The system call/trap handler 73 is invoked by detection of interrupts on system calls from the general-purpose processors 32-1 and 32-2, and the transaction processors 33-1 and 33-2. The cause of an interrupt on a system call is analyzed at the step S401, the system call/trap handler 73 decides whether the processor can resume executing a series of instructions in the process being executed by the processor from an interrupted instruction, at the step S402. If it has been determined at the step S402 that the series of instructions in the process can be resumed by the processor from the interrupted instruction, the system call/trap handler 73 marks the process for executing on the same processor or the same type of the processor at the step S403. Subsequently, at the step S404, after the cause of suspension is cleared, the system call/trap handler 73 stores the process to which the information has been added in the process queue 71. The dispatcher 72 selects the process in the process queue 71 as it becomes the first priority for execution and tries to allocate to the same processor as it has been executing. However, in a case that the processor that has been executing the process is now being used for executing another process, the process is allocated to another thread of the processor, or to another processor if they are available.

If it is determined at the step S402 that the process cannot or inefficient to be resumed by the same processor, the system call/trap handler 73 makes the process that limits a type of a processor executing the process to a general-purpose processor at the step S405. Subsequently, the system call/trap handler 73 executes the step S404.

The dispatcher 72 allocates a process to a specified processor if entry in the process queue 71 includes the information that limits a type of a processor executing the process. For instance, in a case that a process including a floating-point arithmetic operation has been initially allocated to a transaction processor, an interrupt occurs in the process. Subsequently, the process is stored with information specifying a general-purpose processor in the process queue 71. Then the dispatcher 72 allocates the process to one of the general-purpose processors 32-1 or 32-2.

As described above, the system according to the present invention can efficiently execute processes as a whole by allocating all the processes to one of the transaction processors 32-1 and 32-2 since main processes executed by the system are transaction processes. Alternatively, the system may allocate transaction processes to a transaction processor, and processes not proved to be the transaction processes to a general-purpose processor initially. In addition, allocation of processes is desirably optimized according to performances of the general-purpose processors 32-1 and 32-2, and the transaction processors 33-1 and 33-2. In the embodiment, instruction sets may be the same for the general-purpose processors 32-1 and 32-2, and the transaction processors 33-1 and 33-2.

In the above-described embodiment, a description has been given of the system wherein the general-purpose processors 32-1 and 32-2, and the transaction processors 33-1 and 33-2 share the system bus 37 and the main memory 34.

In the above-described invention, there are two types of processors provided in an information-processing device. One of the processors is a general-purpose processor mainly designed to demonstrate high performance over a wide computing area, and to rapidly execute a single program. The other is a multi-thread and/or multi-processing transaction processor mainly designed to execute a large number of small-sized processes concurrently. A transaction process is allocated to the transaction processor. A process that cannot be executed efficiently by the transaction processor is allocated to the general-purpose processor. Accordingly, the present invention provides an information-processing device that can efficiently execute a variety of processes.

Additionally, for instance, in a case that an instruction to execute a floating-point arithmetic operation not implemented in hardware is detected in a process being executed by the transaction processor, the transaction processor interrupts the general-purpose processor. Subsequently, the general-purpose processor executes remaining instructions in the process starting from the instruction to execute the floating-point arithmetic operation. Instructions passed from the transaction processor to the general-purpose processor are the instructions that cannot be executed efficiently by the transaction processor but can be executed efficiently by the general-purpose processor. Such instructions are most likely the instructions for executing floating-point arithmetic operation, but are not limited to the floating-point instructions.

A process may be judged inefficient to be executed by one type of a processor, by monitoring a performance counter or by some other means. In such a case, a transfer of execution of the process may be requested through a system call to optimize overall performance of the entire system.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-348475, filed on Nov. 15, 2000, the entire contents of which are hereby incorporated by reference.

What is claimed is:

1. An information-processing device that executes a specific process more frequently than other processes among a variety of processes, said information-processing device comprising:
a first processor, having a single program counter, configured as hardware implementation to execute an instruction set corresponding to the variety of processes; and
a second processor configured as hardware implementation to execute a portion or entirety of the same instruction set that the first processor executes, said second processor including a plurality of program counters for executing a plurality of processes simultaneously so as to execute a part of said instruction set corresponding to the specific process more efficiently than said first processor,
wherein the specific process is assigned to said second processor for execution by the second processor whereas the other processes are assigned to said first processor for execution by the first processor, and each process is comprised of a series of instructions, the first processor and the second processor being configured such that a series of instructions executed by the first processor is separate from and independent of a series of instructions executed by the second processor.

2. The information-processing device as claimed in claim 1, wherein all the processes are allocated to said second processor initially, wherein said second processor passes a given process to said first processor by interrupting said first processor in a case in which an instruction other than the part of the instruction set corresponding to the specific process must be executed.

3. The information-processing device as claimed in claim 1, wherein all the processes are allocated to said second processor initially, wherein said second processor passes a given process to said first processor by interrupting said first processor when an instruction that cannot be executed or cannot be efficiently executed by said second processor appears in said given process.

4. The information-processing device as claimed in claim 3, wherein said instruction that cannot be executed or cannot be efficiently executed by said second processor is a floating-point arithmetic operation.

5. The information-processing device as claimed in claim 1, wherein said second processor is capable of executing the part of said instruction set corresponding to the specific process more efficiently than said first processor by executing said specific process in parallel by use of at least one of a multi-threading method and a multi-processing method.

6. The information-processing device as claimed in claim 1, wherein said first processor is a general-purpose processor, wherein said second processor is a transaction processor designed to efficiently execute a transaction process as the specific process.

7. The information-processing device as claimed in claim 1, wherein said first processor and said second processor share a memory space.

8. The information-processing device as claimed in claim 1, wherein said information-processing device includes a plurality of first processors and second processors.

9. An information-processing device that executes a specific process more frequently than other processes among a variety of processes, said information-processing device comprising:
   a first processor, having a single program counter, configured as hardware implementation to execute an instruction set and designed to execute variety of processes; and
   a second processor configured as hardware implementation to execute a portion or entirety of the same instruction set that said first processor executes, said second processor including a plurality of program counters for executing multiples of specific processes concurrently so as to achieve more efficient execution than said first processor,
   wherein the specific process is assigned to said second processor for execution by the second processor whereas the other processes are assigned to said first processor for execution by the first processor, and each process is comprised of a series of instructions, the first processor and the second processor being configured such that a series of instructions executed by the first processor is separate from and independent of a series of instructions executed by the second processor.

10. The information-processing device as claimed in claim 9, wherein all the processes are allocated to said second processor initially, wherein said second processor passes a given process to said first processor in a case in which an instruction other than the part of the instruction set corresponding to the specific process must be executed.

11. The information-processing device as claimed in claim 9, wherein all the processes are allocated to said second processor initially, wherein said second processor passes a given process to said first processor when an instruction that cannot be executed appears or the execution of the process is judged not efficient by said second processor in said given process.

12. The information-processing device as claimed in claim 11, wherein said instruction that cannot be executed or cannot be efficiently executed by said second processor is a floating-point arithmetic operation.

13. The information-processing device as claimed in claim 9, wherein said second processor is capable of executing all or the part of said instruction set corresponding to the specific process more efficiently than said first processor by executing said specific processes in parallel by use of at least one of a multi-threading method and a multi-processing method.

14. The information-processing device as claimed in claim 9, wherein said first processor is a general-purpose processor, wherein said second processor is a transaction processor designed to efficiently execute a transaction process as the specific process.

15. The information-processing device as claimed in claim 9, wherein said first processor and said second processor share common memory address space.

16. The information-processing device as claimed in claim 9, wherein said information-processing device includes a plurality of first processors and second processors.

* * * * *